March 14, 1961 N. N. ESTES ET AL 2,975,374
AMPLIFIER FOR LOW FREQUENCY SIGNALS
Filed Nov. 28, 1958
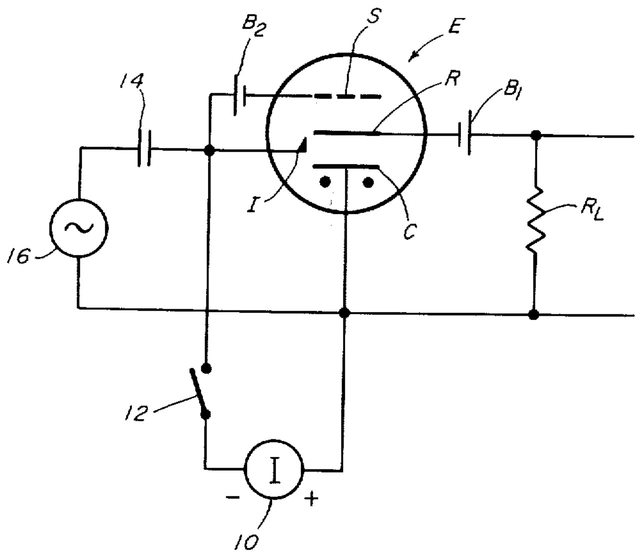
INVENTORS.
NELSON N. ESTES
JAMES J. MOORE.
BY John F. Hohmann

United States Patent Office 2,975,374

Patented Mar. 14, 1961

2,975,374

AMPLIFIER FOR LOW FREQUENCY SIGNALS

Nelson N. Estes and James J. Moore, Austin, Tex., assignors to Union Carbide Corporation, a corporation of New York Filed Nov. 28, 1958, Ser. No. 777,095

1 Claim. (Cl. 330—41)

This invention relates to a low frequency signal amplifier and refers particularly to such a device having an electrical readout integrator.

A family of electrochemical devices in which a number of different effects are achieved by the movement of ions in solution has recently attracted favorable attention. These devices have come to be known as "solions." They are discussed in some detail in the literature: Journal of the Electrochemical Society, vol. 104, No. 12 (December 1957); Yale Scientific Magazine, vol. XXXII, No. 5 (February 1958) and Electronics Products Engineering Bulletin No. 1, published November 1957 by National Carbon Company, 30 East 42nd Street, New York 17, N.Y.

In application Serial No. 717,621, filed February 26, 1958 by Earl S. Snavely, Jr., now Patent No. 2,890,414, reference is made to a particular type of solion described therein as an "electrochemical coulometer" and commonly referred to as an "integrator." This device has the ability to indicate the integral of a current applied to it over a period of time. One type of integrator is provided with electrodes so that its signal can be read electrically; it is termed an "electrical read-out integrator." The present invention employs such a device as its essential component; its construction and function will be explained below.

The invention has for its object an electrochemical amplifier which will amplify a low frequency signal. It will be discussed with reference to the accompanying drawings, in which:

The single figure is a circuit diagram illustrative of the amplifier of the invention.

The invention is an amplifier comprising the combination of an electrical readout integrator and a capacitor, the capacitor being connected in series with the source of the signal to be amplified and the input electrodes of the integrator.

An electrical readout integrator as the term is used herein and in the appended claim is a solion consisting of a cell containing as electrolyte a solution of a reversible redox system, the solution being divided into three zones of different concentration of a measured species of such system, all zones being electrically connected through the electrolyte. One of the three zones is of variable concentration. It is called the "integral" zone. It is provided with two electrodes, one termed the "Common" electrode, or integrator anode, the other the "Readout" electrode, or integrator cathode. Another zone of concentration which is high in concentration of the measured species is referred to as a "reservoir" zone. It contains an electrode termed the "Input" or reservoir electrode. Separating the integral zone and the reservoir zone is a zone dilute in the measured species of the redox system. It is provided with an electrode called a "Shield" or scavenger electrode.

In operating an electrical readout integrator, a biasing voltage is applied across the common and readout electrodes, the common electrode being made the anode of the circuit, so as to furnish the readout current which is proportional to the concentration in the integral zone. A similar biasing voltage is applied across the shield and input electrodes, the latter being made the anode so as to maintain a high concentration of measured species in the reservoir zone and to clear the dilute zone of any ions of the measured species which may have escaped into it from the integral zone. With these electrodes biased as described, when a source of current is connected across the input electrode and the common electrode so that the latter is the anode, the concentration of the measured species of the redox system is increased in the integral zone. The increase can be read electrically on a suitable meter in the biasing circuit of the integral zone. When the current source is disconnected, the increased concentration of measured species is maintained in the integral zone by reason of the configuration and location of electrodes in that zone, and when the source is again connected, again an increase in concentration is noted. Thus, the device integrates the current applied over a period of time.

Referring now to the drawing, an electrical readout integrator E is diagrammatically represented. The biasing voltage across the readout electrode R and the common electrode C is provided by a battery $B_1$ connected so as to make the common electrode C the anode. The biasing voltage across the shield electrode S and the input electrode I is provided by a battery $B_2$ connected so as to make the input electrode I the anode of the circuit. Both batteries have the same voltage, suitable 0.9 volt.

In the circuit of the invention it is necessary to provide initially a relatively high concentration of measured species in the integral compartment of the integrator. For this purpose a source 10 of current is connected across the input electrode I and the common electrode C so that the latter is the anode of the circuit. A switch 12 is provided in the circuit for opening and closing it. A capacitor 14 is connected in series with a source 16 of a signal to be amplified and the input electrode I and the common electrode C. It will be noted at this point that the electrodes I and C are both input electrodes for the integrator E. A load resistance $R_L$ is connected in series with the battery $B_1$ and the electrodes R, C for determining the output voltage. To determine current output a suitable ammeter would be connected in like manner.

To operate the amplifier of the invention, it is necessary, as above stated, to provide a supply of measured species of the redox system in the integral compartment. This is accomplished by closing the switch 12 and permitting current to flow from the current source 10 until the desired concentration is achieved. The switch 12 is then opened, but the concentration in the integral compartment is prevented from changing by the configuration and location of the electrodes R, C. A signal from the signal source 16 may then be fed through the capacitor 14 into the integrator E across the input electrodes I, C. The resistance of the path in combination with the capacitor produces a derivative current analogous to that obtained when a capacitor and a resistor are connected in series with a signal. This derivative current is then fed to the integrator E where it is integrated and thus restored to the original type of signal but amplified.

The value of the capacitor 14 should be balanced with respect to the input resistance and the frequency of the signal to be amplified. The higher the resistance, the lower should be the capacity, and the lower the frequency of the signal to be amplified the lower is the capacity required of the capacitor 14.

In one amplifier constructed in accordance with the invention the integrator had an electrolyte containing the iodine-iodide system dissolved in a methyl alcohol-water mixture containing 25 percent alcohol by volume. The solution was 0.025 N in iodine and 0.5 N in potassium iodide. The input resistance of the integrator, which is the resistance of the solution between the electrodes I, C was about 1000 ohms. It is pointed out that this resistance increases somewhat with increases in iodine concentration in this zone. The capacitor 14 had a capacity of 800 microfarads. Signals varying from 1.0 cycle per hour to 0.5 cycle per second were successfully amplified.

Typical of the range of amplification obtained by the amplifier of the invention, a voltage amplification of 14 times was obtained with a load resistance of 2750 ohms, at a frequency of 0.01 cycle per second.

It will be seen that the invention thus provides effective amplification of low frequency signals. A theoretical explanation for the operation of the circuit of the invention may be set forth as follows:

Let the output current through $R_L$ be designated $I_o$; the input current from the source 16 may be designated $I_n$ which equals $I_p \sin \omega t$ where $I_p$ is the peak value of the current and $\sin \omega t$ represents an alternating signal of frequency, $$f=\frac{\omega}{2\pi}$$

The output current is proportional to the integral of the input current and is expressed by the following equation:

$$I_o=k\int I_p \sin \omega t dt \quad (1)$$

Carrying out the mathematical operation indicated by Equation 1 gives $$I_o=\frac{kI_p}{\omega}(-\cos \omega t) \quad (2)$$

The $(-\cos \omega t)$ simply indicates that the output signal is a sine function which has been shifted backwards in time by an angle equal to $$\frac{\pi}{2}$$

If the gain of the amplifier is defined to be $$G=\frac{I_o}{I_{in}} \quad (3)$$

then the gain is given by $$G=\frac{I_o}{I_{in}}=\frac{\frac{kI_p}{\omega}(-\cos \omega t)}{I_p \sin \omega t} \quad (4)$$

It will be noted that for unity gain $k=\omega$ or, in other words, the cut-off frequency at which the gain is unity is equal to the constant of proportionality factor between the output current and the integral of the input current. The general expression for the gain (Equation 4) shows that the gain is inversely proportional to $\omega$ which is characteristic of any device in which the output current is proportional to the integral of the input current. The phase shift between input and output is $$\frac{\pi}{2}$$

radians at the frequence where the gain is unity.

A full description of an electrical readout integrator suitable for use in the amplifier of the invention is found in the application of Nelson N. Estes, Serial No. 777,009 filed concurrently herewith.

We claim:

An amplifier for amplifying a low frequency signal, which comprises in combination an electrical readout integrator and a capacitor, said integrator comprising a cell containing as an electrolyte a solution of a reversible redox system, said solution being divided into zones of different concentration of a measured species of said system, a readout electrode and a common electrode in one of said zones having a variable concentration of said measured species, an input electrode in another of said zones high in concentration of said measured species and a shield electrode in a zone dilute in said measured species, said readout electrode being biased negative with respect to said common electrode and said shield electrode being biased negative with respect to said input electrode, said capacitor being connected in series with a source of a signal to be amplified and the input and common electrodes of said integrator.

References Cited in the file of this patent

UNITED STATES PATENTS

| | | |
|---|---|---|
| 1,180,090 | Thorpe | Apr. 18, 1916 |
| 2,685,025 | Root | July 27, 1954 |
| 2,824,242 | Hardy et al. | Feb. 18, 1958 |
| 2,858,527 | Bowditch et al. | Oct. 28, 1958 |

OTHER REFERENCES

Publication: Journal of Electrochemical Society, volume 104, No. 12, December 1957, pages 727–730, "Low Power Electrochemical Control Devices."